(12) United States Patent
Cutler (10) Patent No.: US 7,495,694 B2
(45) Date of Patent: Feb. 24, 2009

(54) OMNI-DIRECTIONAL CAMERA WITH CALIBRATION AND UP LOOK ANGLE IMPROVEMENTS

(75) Inventor: Ross Cutler, Duvall, WA (US)

(73) Assignee: Microsoft Corp., Redmond, WA (US)

( * ) Notice: Subject to any disclaimer, the term of this patent is extended or adjusted under 35 U.S.C. 154(b) by 750 days.

(21) Appl. No.: 10/902,675

(22) Filed: Jul. 28, 2004

(65) Prior Publication Data

US 2006/0023074 A1 Feb. 2, 2006

(51) Int. Cl.
*H04N 5/225* (2006.01)
(52) U.S. Cl. .................. 348/218.1; 348/36; 352/69; 359/725
(58) Field of Classification Search ............. 348/218.1, 348/219.1, 195, 202, 335, 350, 343, 344, 348/360, 361, 373, 375, 264, 262; 359/381, 359/201, 202, 200, 210
See application file for complete search history.

(56) References Cited

U.S. PATENT DOCUMENTS

| | | | |
|---|---|---|---|
| 2,931,267 A | 4/1960 | Hoch | |
| 3,118,340 A | 1/1964 | Iwerks | |
| 5,539,483 A | 7/1996 | Nalwa | |
| 5,745,305 A | 4/1998 | Nalwa | |
| 5,793,527 A | 8/1998 | Nalwa | |
| 5,969,760 A * | 10/1999 | Ernest et al. ............ | 348/357 |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,111,702 A * | 8/2000 | Nalwa ..................... | 359/725 |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |
| 6,285,365 B1 | 9/2001 | Nalwa | |
| 6,313,865 B1 | 11/2001 | Driscoll, Jr. et al. | |
| 6,331,869 B1 | 12/2001 | Furlan et al. | |
| 6,337,708 B1 | 1/2002 | Furlan et al. | |

(Continued)

FOREIGN PATENT DOCUMENTS

JP 1996125835 A 5/1996

OTHER PUBLICATIONS

U.S. Appl. No. 10/608,363, filed Jun. 26, 2003, Cutler.

(Continued)

*Primary Examiner*—Ngoc-Yen T Vu
*Assistant Examiner*—Cynthia Calderon
(74) *Attorney, Agent, or Firm*—Lyon & Harr, LLP; Katrina A. Lyon (57) ABSTRACT

Improved camera calibration techniques, including an improved up look angle and an improved method for calibrating a virtual center of projection. By using a view camera technique for the up look angle, the image sensors can be mounted flat to a Printed Circuit Board (PCB). By using a sub-region of the image sensor for the active area of the camera it is possible to calibrate the virtual center of projection (C').

6 Claims, 7 Drawing Sheets

U.S. PATENT DOCUMENTS

| | | | |
|---|---|---|---|
| 6,341,044 | B1 | 1/2002 | Driscoll, Jr. et al. |
| 6,346,967 | B1 | 2/2002 | Gullichsen et al. |
| 6,356,296 | B1 | 3/2002 | Driscoll, Jr. et al. |
| 6,356,397 | B1 | 3/2002 | Nalwa |
| 6,369,818 | B1 | 4/2002 | Hoffman et al. |
| 6,373,642 | B1 | 4/2002 | Wallerstein et al. |
| 6,388,820 | B1 | 5/2002 | Wallerstein et al. |
| 6,392,687 | B1 | 5/2002 | Driscoll, Jr. et al. |
| 6,424,377 | B1 | 7/2002 | Driscoll, Jr. et al. |
| 6,426,774 | B1 | 7/2002 | Driscoll, Jr. et al. |
| 6,459,451 | B2 | 10/2002 | Driscoll, Jr. et al. |
| 6,466,254 | B1 | 10/2002 | Furlan et al. |
| 6,480,229 | B1 | 11/2002 | Driscoll, Jr. et al. |
| 6,493,032 | B1 | 12/2002 | Wallerstein et al. |
| 6,515,696 | B1 | 2/2003 | Driscoll, Jr. et al. |
| 6,539,547 | B2 | 3/2003 | Driscoll, Jr. et al. |
| 6,583,815 | B1 | 6/2003 | Driscoll, Jr. et al. |
| 6,593,969 | B1 | 7/2003 | Driscoll, Jr. et al. |
| 6,597,520 | B2 | 7/2003 | Wallerstein et al. |
| 6,700,711 | B2 | 3/2004 | Nalwa |
| 6,741,250 | B1 | 5/2004 | Furlan et al. |
| 6,756,990 | B2 | 6/2004 | Koller |
| 6,885,509 | B2 | 4/2005 | Wallerstein et al. |
| 6,924,832 | B1 | 8/2005 | Shiffer et al. |
| 7,020,337 | B2 | 3/2006 | Viola et al. |
| 7,031,499 | B2 | 4/2006 | Viola et al. |
| 7,099,510 | B2 | 8/2006 | Jones et al. |
| 7,123,292 | B1 * | 10/2006 | Seeger et al. ............. 348/218.1 |
| 7,197,186 | B2 | 3/2007 | Jones et al. |
| 7,212,651 | B2 | 5/2007 | Viola et al. |
| 2002/0034020 | A1 | 3/2002 | Wallerstein et al. |
| 2002/0051252 | A1 * | 5/2002 | Chang et al. ................ 358/505 |
| 2002/0063802 | A1 | 5/2002 | Gullichsen et al. |
| 2002/0094132 | A1 | 7/2002 | Hoffman et al. |
| 2002/0154417 | A1 | 10/2002 | Wallerstein et al. |
| 2003/0142402 | A1 | 7/2003 | Carbo et al. |
| 2003/0193606 | A1 | 10/2003 | Driscoll et al. |
| 2003/0193607 | A1 | 10/2003 | Driscoll et al. |
| 2004/0008407 | A1 | 1/2004 | Wallerstein et al. |
| 2004/0008423 | A1 | 1/2004 | Driscoll et al. |
| 2004/0021764 | A1 | 2/2004 | Driscoll et al. |
| 2004/0252384 | A1 | 12/2004 | Wallerstein et al. |
| 2004/0254982 | A1 | 12/2004 | Hoffman et al. |

OTHER PUBLICATIONS

Rui, Y., A. Gupta and J. J. Cadiz, Viewing meetings captured by an omni-directional camera, *CHI 2001*, vol. 3, No. 1, pp. 450-457.

Rui, Y., L. He, A. Gupta and Q. Liu, Building an intelligent camera management system, *Proc. of ACM Multimedia '01*, Ottawa.

Greiffenhagen, M., V. Ramesh, D. Comaniciu, and H. Niemann, Statistical modeling and performance characterization of a real-time dual camera surveillance system, *IEEE Conf. Comp. Vision and Pattern Recognition (CVPR'00)*, 2000, vol. 2, 335-342.

Image stabilizer system, last accessed on May 26, 2004 at http://www.canon.com/technology/detail/digi_video/shakecorrect_shift.

Kostas, D., Welcome to the page of omnidirectional vision, last accessed on May 12, 2004 at http://www.cis.upenn.edu/~kostas/omni.html.

Hicks, R. A., Catadioptric sensor designs by R. Andrews Hicks, last accessed on May 12, 2004 at http://eee.cs.drexel.edu/~ahicks/design/hicks-designs.html.

Columbia University, Omnicamera: Omnidirectional video camera, last accessed on May 12, 2004 at http://wwwl.cs.columbia.edu/CAVE/omnicam.

Pless, R., New technologies, last accessed on May 12, 2004 at http://www.cs.wustl.edu/~pless/camera.hmtl.

Argyros, A., Robot homing based on panoramic vision, last accessed on May 12, 2004 at http://www.ics.forth.gr/~argyros/research/pan_homing.htm.

Omnidirectional vision, last accessed on May 12, 2004 at http://cmp.felk.cvut.cz/demos/OmnidirectionalVision.html.

The VAST lab: Vision and software technology laboratory, Lehigh University, last accessed on May 12, 2004 at http://www.eecs.lehigh.edu/~vast.

The Atacama Desert trek, last accessed on May 12, 2004 at http://www-2.cs.cmu.edu/afs/cs/project/lri-13/www/atacama-trek/.

Fiala, M., Research, last accessed on May 12, 2004 at http://www.cs.ualberta.ca/~fiala.

Larson, S., Eyes from eyes: Towards a new, biologically motivated, camera technology, last accessed on May 12, 2004 at http://www.cfar.umd.edu/~larson/EyesFromEyes.hmtl.

Srinivasan, M. V., J. S. Chahl, M. A. Garratt, A. Mitzutani, D. Soccol and G. Ewyk, Biorobotic vision laboratory, last accessed on May 12, 2004 at http://cvs.anu.edu.au/bioroboticvision.

Office of the future, last accessed on May 12, 2004 at http:///www.cs.unc.edu/Research/stc.

Taylor, C. J., VideoPlus, last accessed on May 12, 2004 at http://www.cis.upenn.edu/~cjtaylor/projects/VideoPlus/VideoPlus.html.

Stiefelhagen, R., J. Yang, A. Waibel, Modeling focus of attention for meeting indexing, *ACM Multimedia '99*, Oct. 1999, Orlando, Florida, pp. 3-10.

Zheng, J. Y., and S. Tsuji, Panoramic view, last accessed on May 12, 2004 at http://www.cs.iupui.edu/~jzheng/panorama.html.

Dersch, H., Panoramas and objectmovies in PDF-documents, last accessed on May 12, 2004 at http://webuser.fh-furtwangen.de/~dersch/pdfpanorama/Readme.html.

Lacriox, S., and J. Gonzalez, Robotics in natual environments—LAAS/CNRS, last accessed on May 12, 2004 at http://www.laas.fr/~simon/eden/rover/perception/pano.php.

Ulrich, I., I. Nourbakhsh, Appearance-based place recognition for topological localization, last accessed on May 12, 2004 at http://www-2.cs.cmu.edu/~iwan/localization.htm.

Digital Photography, last accessed on May 12, 2004 at http://www.digitalphotography.org.

Robot team, last accessed on May 12, 2004 at http://w3.sys.es.osaka-u.ac.jp/projects/robot/index-e.html.

Frintrop, S., I. Stratmann, E. Rome, and V. Becanovic, Omnidirectional imaging for robotic applications, last accessed on May 12, 2004 at http://www.ais.fraunhofer.de/services/OmniVision/omni-intro.html.

Stereo Omnidirectional System, last accessed on May 12, 2004 at http://www.viewplus.co.jp/products/sos/sos_english/sos_main_english.html.

Introducing the 0-360 Panoramic Optic, last accessed on May 12, 2004 at http://www.0-360.com.

360-degree Products, last accessed on May 12, 2004 at http://www.remotereality.com/vtprod/index.html.

Be Here Corporation, last accessed on May 12, 2004 at http://www.behere.com.

Egg Solution Photo 360° Product, last accessed on May 12, 2004 at http://www.eggsolution.com/prod_photo.htm.

Circarana photographic unit, last accessed on May 12, 2004 at http://cinerama.topcities.com/circarama.htm.

\* cited by examiner

OMNI-DIRECTIONAL CAMERA WITH CALIBRATION AND UP LOOK ANGLE IMPROVEMENTS

BACKGROUND

1. Technical Field

This invention is directed toward a new camera design. More specifically, this invention is directed toward a camera design with an improved up look angle and an improved ability to calibrate a virtual center of projection.

2. Background Art

Video conferencing has become more popular in recent years. Various video conferencing camera systems have been developed for this purpose. In many video conferencing scenarios an omni-directional camera is placed in the middle of a conference room table. This camera captures images of the meeting participants sitting around the table for transmission to a remote site or later play back of the meeting for those unable to attend.

There are two general categories of omni-directional or panoramic video cameras: single sensor and multiple sensor designs. Single sensor omni-directional cameras use multiple mirrors to image a 360 degree horizontal field of view onto an image sensor. Single sensor designs are limited in resolution by the image sensor, and are typically more expensive than multi-sensor designs. Their resolution and frame rate are also typically limited. In addition, the curved mirror designs used in these single sensor designs have typically suffered from a limited depth of field. Multi-sensor designs do not have the aforementioned limitations of single sensor designs and are therefore typically preferable. These multi-sensor designs can often be difficult to calibrate and manufacture however.

In video recording multiple participants in a meeting for transmission or later playback, it is important to situate the camera in such a way that less of the conference room table is captured and more of the meeting participants are captured. This increases the efficiency with which the meeting data can be transmitted or archived.

SUMMARY

The camera system and method of the present invention provides an improved up look angle (meaning the chief ray points above the horizon) to capture more of the desired subject matter and an improved method for calibrating a virtual center of projection between adjacent cameras in a multi-sensor camera design.

One embodiment of the invention is an improvement over the camera system described in co-pending patent application Ser. No. 10/608,363, entitled "OMNI-DIRECTIONAL CAMERA DESIGN FOR VIDEO CONFERENCING", filed on Jun. 26, 2003. This camera system uses N cameras and an N-sided mirror to capture images of the surrounding scene. The images from the N cameras are stitched together to create a 360-degree panorama using a calibration surface. The present invention extends the camera system described in the aforementioned co-pending patent application to improve manufacturability in two ways. First, by using a view camera technique to achieve an up look angle, the image sensors can be mounted flat to a printed circuit board (PCB). Secondly, by using a sub-region of the image sensor for the active area the camera system of the invention allows for the electronic calibration of each camera's virtual center of projection (C') and provides boresighting. Boresighting typically aligns the lens optical axis with the image sensor center. In system and method according to the invention the term boresighting includes a prescribed image sensor location that is shifted from the center. Using the sensor sub-region eliminates two degrees of freedom from mechanical calibration.

To achieve the desired up look angle, while keeping the camera sensors parallel to the image plane (and preferably mounted flat on a PCB), the optical axis angle χ (the angle of the optical axis with the vertical) is shifted by offsetting the center of the camera lens from the center of the sensor, which in turn offsets the optical axis. The optical axis is the straight line that is coincident with the axis of symmetry of the lens and sensor surfaces.

Additionally, the camera system and method of the invention uses a sub-region of the image sensor for the active area to calibrate a camera's virtual center of projection C'. By adjusting the location (x and y offset) of the sub-region of the image sensor, the virtual center of projection C' of the camera can be shifted. More specifically, changing the position of the lens relative to the sensor in the x and/or y directions changes the optical axis and the position of C'. This technique can be viewed as causing an image shift that changes the optical axis to intersect a nominal point on the calibration surface used for image stitching. This technique simulates mechanical calibration screws on the lens, moving the lens parallel to the image plane, but without the requirement for any moving parts. Shifting the lens in the z direction relative to the sensor changes the focus.

Thus, the camera system and method according to the invention is advantageous in that it is lower cost, easier to calibrate and easier and less expensive to manufacture achieved by mounting the image sensors on a flat surface. This configuration images less of the table, and allows imaging of people standing near the table, or sitting around it, at higher resolutions. This configuration maximizes the use of the imaging sensors, further reducing cost of the system. More specifically, cameras with a smaller vertical field of view can be used as almost the entire field of view captures the video conference participants' faces and not extraneous data such as the surface the camera is sitting on. Cameras with a larger field of view require higher resolution sensors to achieve similar performance.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
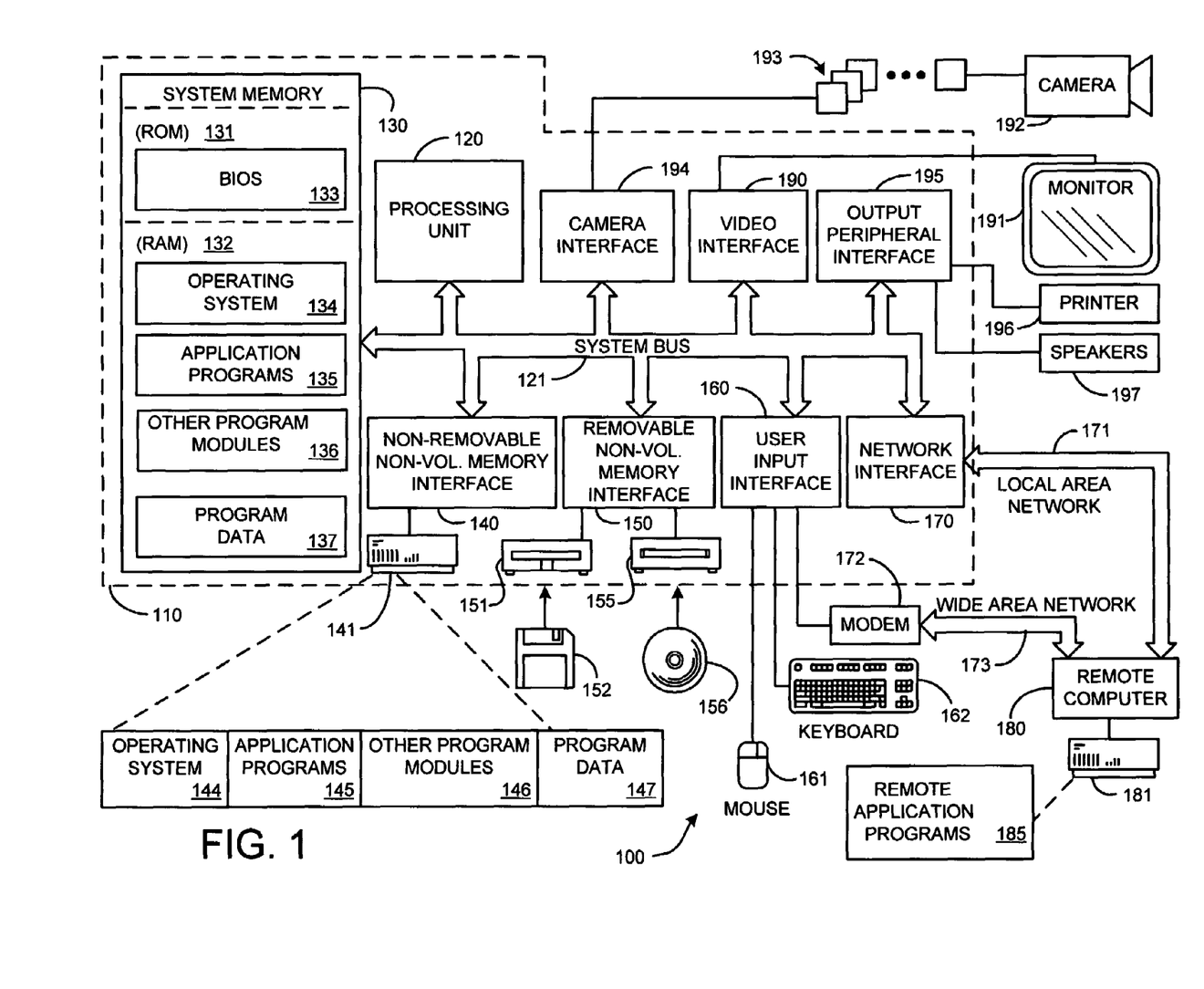
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Omni-Directional Camera with Calibration and Up Look Angle Improvements.

2.1 Overview

Figure 2:
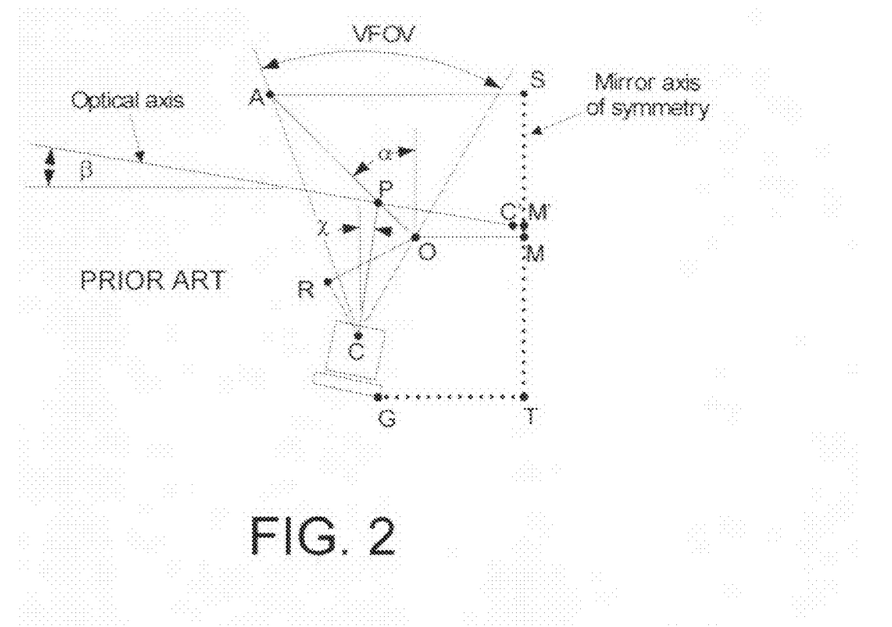
FIG. 2 depicts a camera and mirror system. A single camera is shown with center of projection C and with a virtual center of projection C'. M is the center of the mirror base.
Figure 3:
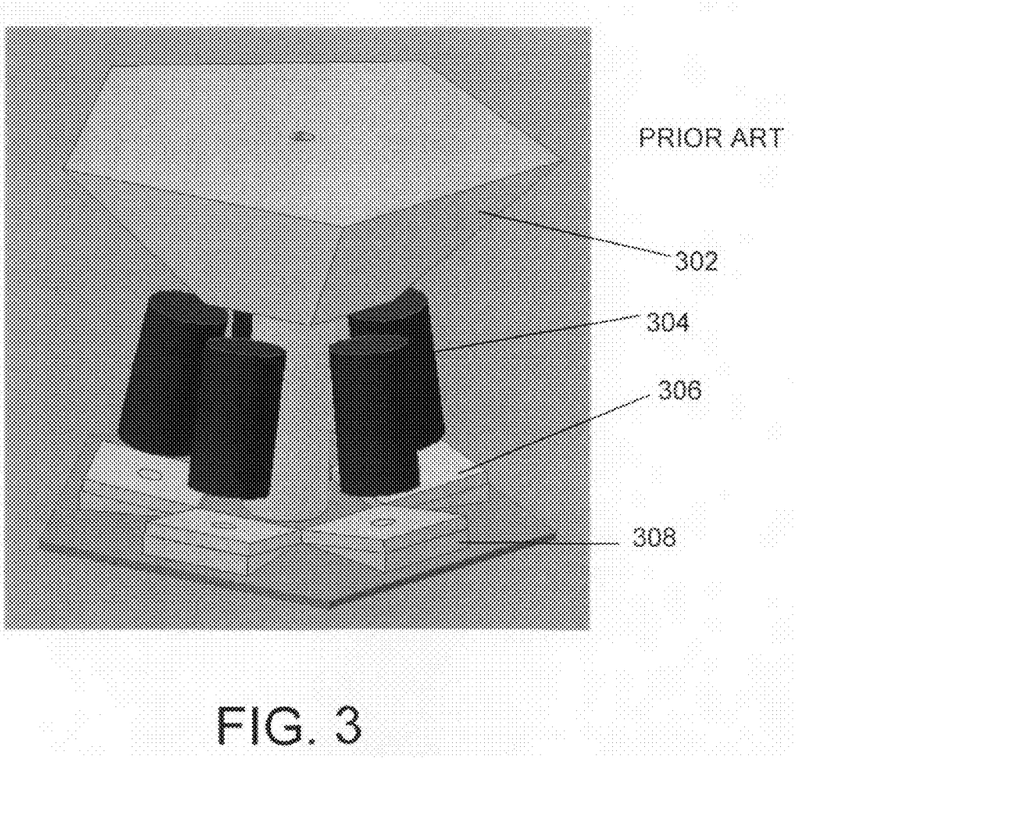
FIG. 3 is a drawing of an embodiment of an omni-directional camera shown in FIG. 2. This design uses a 5-sided mirror. The virtual centers of projection are inside the mirror, which allows them to be effectively "packed" arbitrarily close together.

The camera system and method of the present invention provides an improved up look angle and an improved method for calibrating a virtual center of projection for a multi-sensor camera system. The camera system according to the invention improves on a prior camera designs, such as shown in FIGS. 2 and 3, in that it improves manufacturability in two ways:
1. By using a view camera technique for the up look angle, the image sensors can be mounted flat to a Printed Circuit Board (PCB) (see FIG. 4).
2. By using a sub-region of the image sensor the virtual center of projection (C') can be electronically calibrated (see FIGS. 2, 7, 8, and 9).

2.2 Background: Prior Omni-Directional Camera Design.

One embodiment of the invention is an improvement over the camera system described in co-pending patent application Ser. No. 10/608,363, entitled "OMNI-DIRECTIONAL CAMERA DESIGN FOR VIDEO CONFERENCING", filed on Jun. 26, 2003 (see FIGS. 2 and 3 for one embodiment of this camera system). In general, the camera system of the aforementioned patent application uses N cameras and an N-sided mirror to capture images of the surrounding scene. The images from the N cameras are stitched together to create a 360-degree panorama using a calibration surface.

More specifically, to achieve a low cost high resolution panoramic image, multiple cameras are used and the images are stitched together. To stitch the images together in real-time, a static image stitcher is used, which stitches images together perfectly for objects on a calibration surface (e.g., the calibration surface can be defined by the boundary of the table the camera is on). However, objects not near that surface exhibit stitching errors. The distance that the object can move away from the calibration surface with less than or equal to one pixel stitching error is called the depth of field without stitching error (DOFWSE). The DOFWSE is a function of the distance between adjacent camera's center of projection (DBACCOP) (the camera's center of projection is the entrance pupil position, and is the point which a camera can be rotated and not induce parallax) and the distance between the calibration surface and the camera. To eliminate stitching errors and not require in-room calibration for large conference rooms (e.g., 10 m in radius), the DBACCOP typically needs to be 3 mm or smaller. In one working embodiment of the invention the DBACCOP is less than 2 mm, but this depends on sensors used and the acceptable level of stitching error.

The elimination of stitching errors can be achieved by using the camera design shown in FIGS. 2 and 3. In this design, as shown in FIG. 3, the mirrors 302 create a virtual center of projection (not shown) for each camera 304. The parameters of the mirror and camera (see Table 1) can be adjusted to make DBACCOP arbitrarily small. However, one does not need the DBACCOP to be 0, since conference rooms are typically bounded in size (e.g., <10 m in radius). Moreover, a 0 DBACCOP would allow for no overlap between adjacent cameras, which is used by the stitcher to make the panorama seamless, and is required during manufacturing (with no overlap, other tolerances in the optical system need to be 0, which is not practical). Therefore, the camera and mirror parameters can be adjusted to minimize the camera head size while still virtually eliminating stitching errors.

2.3 Improved Up Look Angle.

The omni-directional camera design described in the aforementioned co-pending patent application includes an up look angle β as shown in FIG. 2. This angle is important to image less of the conference room table and more of the conference room participants. The angle β (the angle between the camera's optical axis and the horizon) can be achieved by tilting the camera sensor χ (tilt of camera with respect to the vertical) as shown in FIG. 2, and is related to the mirror angle by β=90−(2α+χ) as described in the aforementioned co-pending application. More specifically, as shown in FIG. 3, to achieve the optical axis angle χ with respect to the vertical, the lens 304 and sensors 306 can be tilted together by using a wedge 308. The variables used in FIG. 2 are described in Table 1 below.

TABLE 1

Variables shown in FIG. 2

| Parameters | Description |
| --- | --- |
| α | Angle of the mirror face and the vertical |
| χ | Angle of optical axis from camera with respect to the vertical |
| β | Angle between optical axis from mirror and the horizon |
| A | Midpoint on top edge of mirror facet |
| AS | Inner radius of top mirror |
| C | Center of projection of camera |
| C' | Virtual center of projection of camera |
| G | Midpoint on edge of image sensor inner side |
| M | Intersection of bottom plane of mirror and axis of symmetry |
| M' | M horizontally projected on mirror axis of symmetry |
| MO | Inner radius of bottom mirror |
| MS | Height of mirror |
| O | Midpoint on bottom edge of mirror facet |
| P | Intersection of optical axis and mirror facet |
| R | Point on lowest incoming ray closest to C |
| T | Intersection of sensor plane and mirror axis of symmetry |
| VFOV | Vertical field of view |

Figure 4:
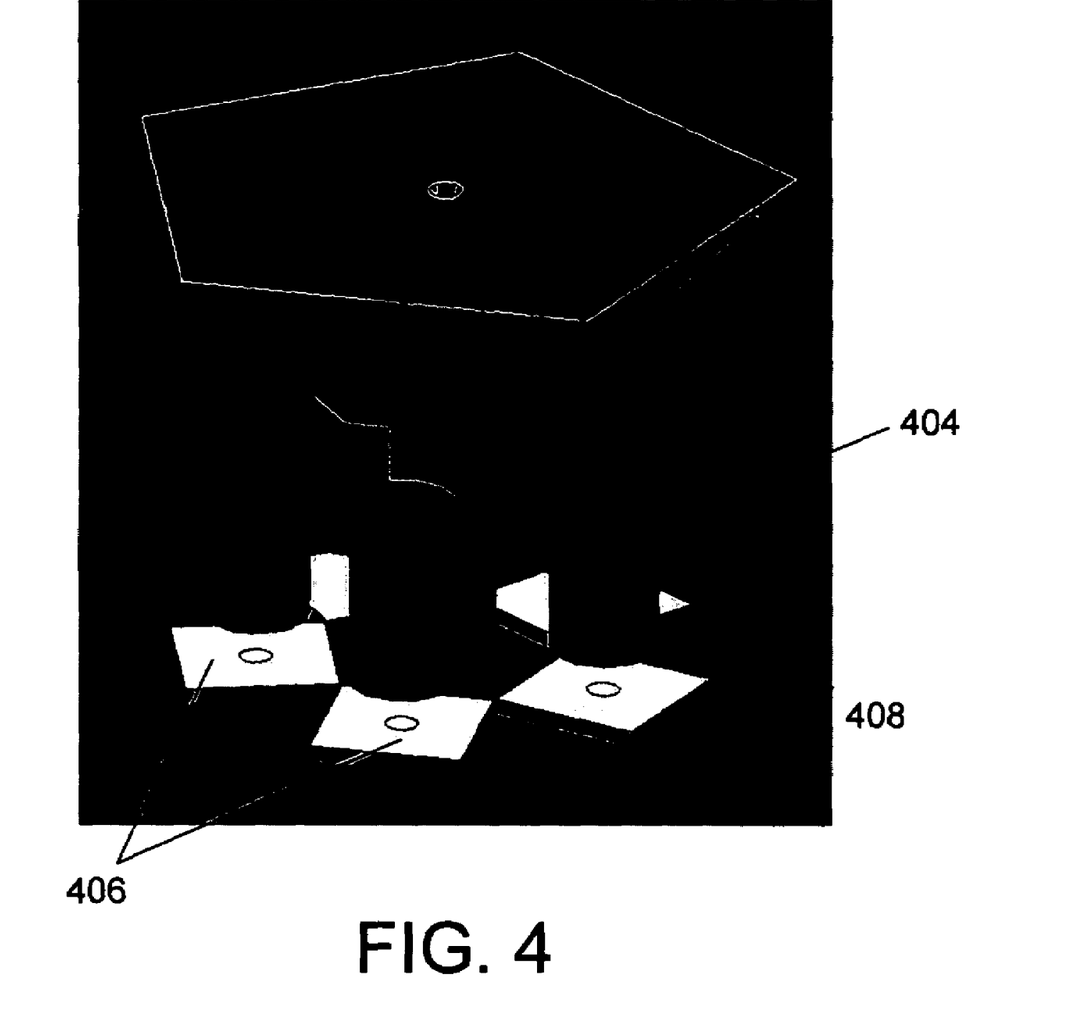
FIG. 4 is a drawing of a camera and mirror system according to the invention that has the same uplift angle as FIG. 2 with a view camera and image sensor mounted flat to the Printed Circuit Board.

However, χ can also be achieved by using a view camera method as shown in FIG. 4. More specifically, the sensors 406 can be parallel to a common plane (e.g., a printed circuit board (PCB)) 408 and the lens shifted 404 to achieve an optical axis angle χ using a view camera technique. The latter technique is preferred, since it should be easier and less expensive to manufacture.

Figure 5:
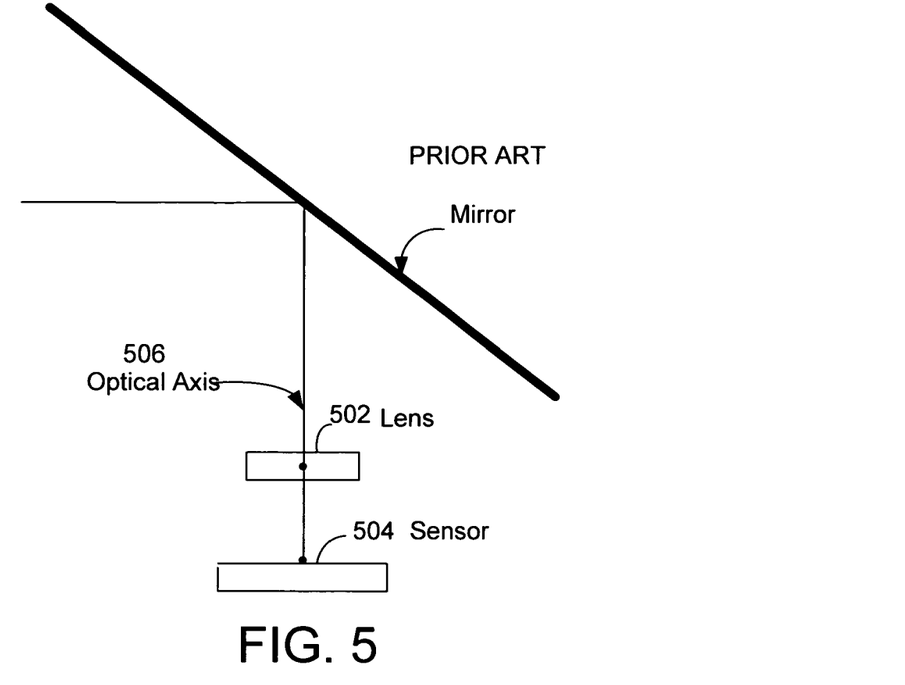
FIG. 5 is a schematic of a typical lens and sensor alignment wherein the optical axis passes through the center of the lens and the center of the sensor.
Figure 6:
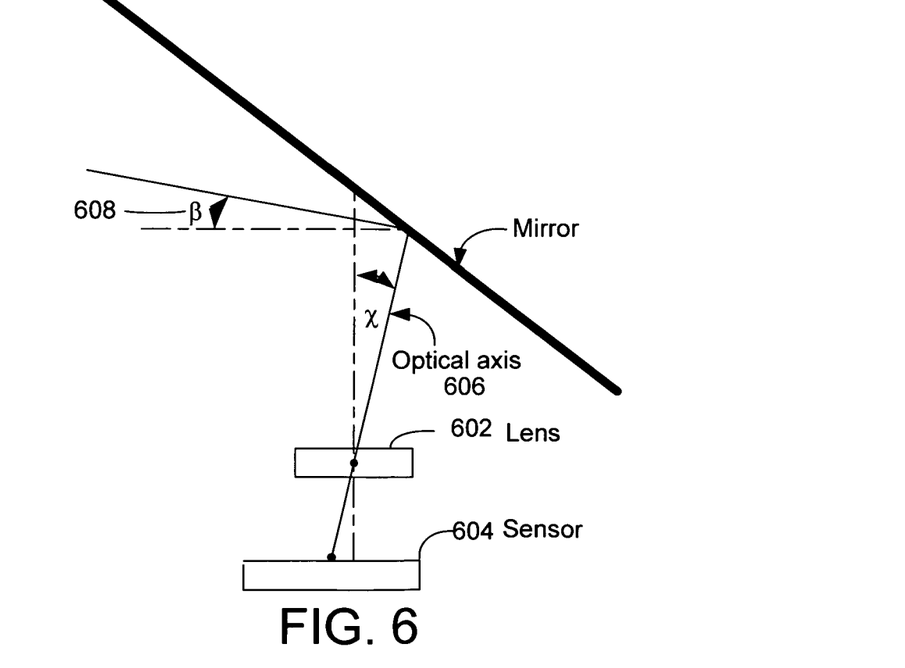
FIG. 6 is a schematic of the lens and sensor alignment wherein the optical axis is moved by shifting the lens with respect to the center of the sensor thereby achieving a desired up look angle.
Figure 7:
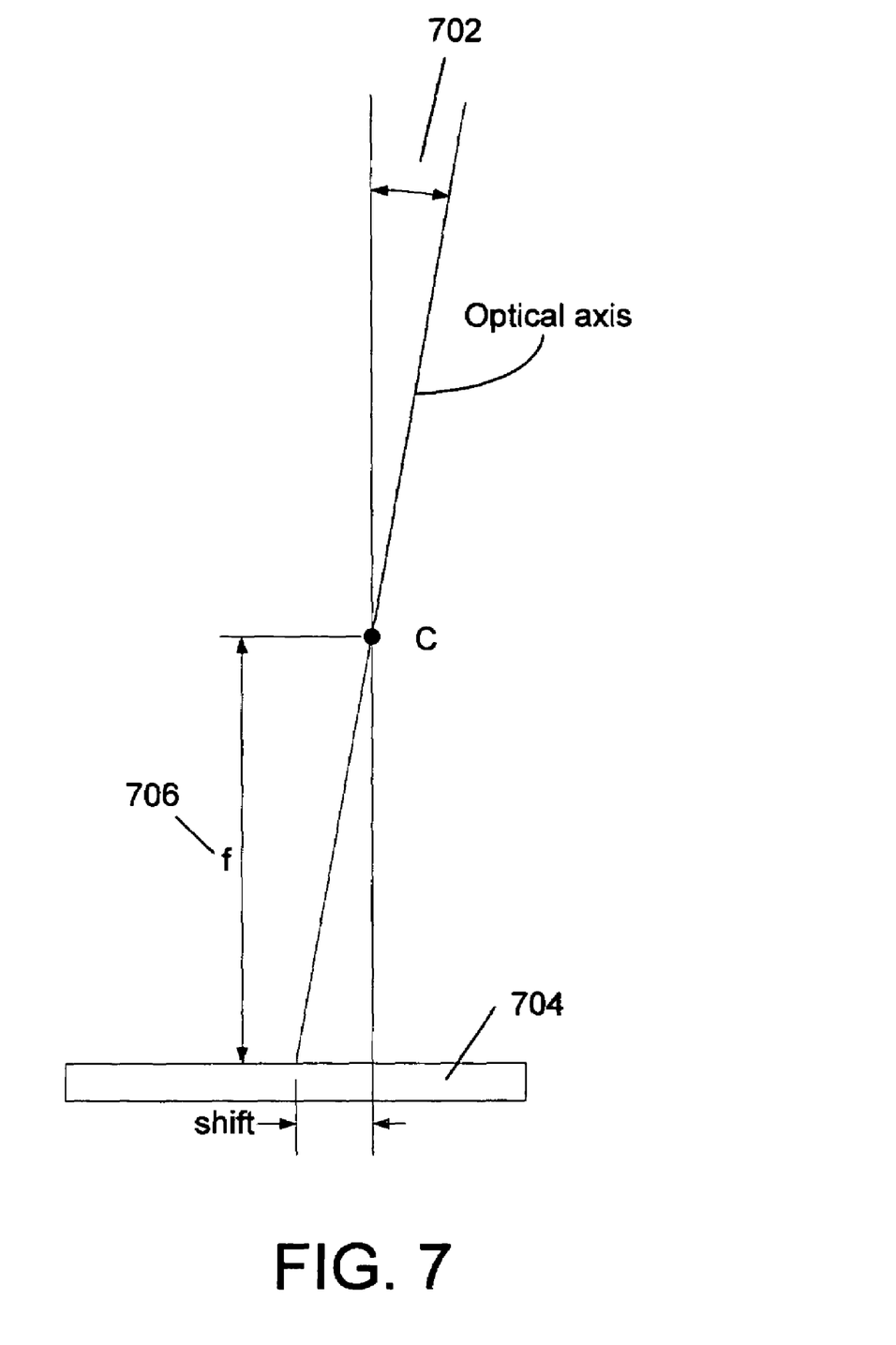
FIG. 7 is a schematic of the sensor shift required to achieve the desired tilt angle of camera with respect to the vertical using the view camera technique of the system and method of the invention.

A view camera differs from an ordinary camera by allowing the lens to tilt with respect to the sensor plane, and shift with respect to the central ray. As shown in FIG. 5, in a typical camera lens 502 and sensor 504 configuration the center of the sensor and the center of the lens are aligned and the optical axis 506 passes through both the center of the sensor and the center of the lens. In the system and method of the camera system of the present invention, a simplified view of which is shown in FIG. 6, the camera sensor 604 is mounted flat on a printed circuit board that the other image sensors are mounted on, and the center of the image sensor 604 is offset from center of the lens 602 which in turn offsets the optical axis 606 to achieve the desired up look angle β 608 while ensuring that the image is completely captured by the sensor. This results in a simpler mechanical design and reduces the possibility for image sensor misalignment. As shown in FIG. 7, to achieve a desired up look angle β an angle for a camera with focal length f 706, the sensor 704 needs to be shifted horizontally by f*tan(χ) where χ is the angle of the optical axis with the vertical.

In one exemplary five camera embodiment of the invention, Boowon BW38B-1000 camera lenses are used with OV8610 sensors. For this embodiment, α (angle of the mirror face and the vertical) has a range between 20 and 70 degrees, while χ (the angle of optical axis from camera with respect to the vertical) was between −4 to 4 degrees.

2.3.2 Electronic Calibration of the Virtual Center of Projection.

As discussed above, to achieve a low cost high resolution panoramic image, multiple cameras are used and the images are stitched together using a calibration surface. Objects not near that surface exhibit stitching errors. The distance that the object can move away from the calibration surface without stitching errors is called the depth of field without stitching error (DOFWSE). The DOFWSE is a function of the distance between adjacent camera's center of projection (DBACCOP) and the distance between the calibration surface and the camera. In one embodiment of the design discussed in the aforementioned co-pending patent application and shown in FIGS. 2 and 3, mirrors create a virtual center of projection for each camera. The parameters of the mirror and camera can be adjusted to make DBACCOP arbitrarily small. In order to achieve the desired camera and mirror parameters it is necessary to calibrate the virtual center of projection (C') between adjacent cameras to achieve the desired distance between them. Calibration of the virtual center of projection can be calculated mechanically or electronically.

Cameras are typically mechanically calibrated. The preferred methods of mechanical calibration for a camera employing mirrors or reflective surfaces are in order:

1. Only focus calibration
2. Focus and boresighting (shifting the camera parallel to image plane)
3. Focus, boresighting, and mirror adjustments.

The system and method of the present invention provides a method to electronically (not mechanically) calibrate the virtual center of projection (C') (method 2 above). The points C' for adjacent cameras need to be within a minimal distance, and if this distance is violated, the images from the two cameras cannot be stitched together without artifacts. The location of the virtual center of projection C' can be perturbed due to manufacturing errors (e.g., mirror position, image sensor position, lens position, etc). These manufacturing errors can be accounted for using mechanical calibration as discussed above (e.g., turning screws on the lenses), but this is undesirable due to labor costs and manufacturing time.

Figure 8:
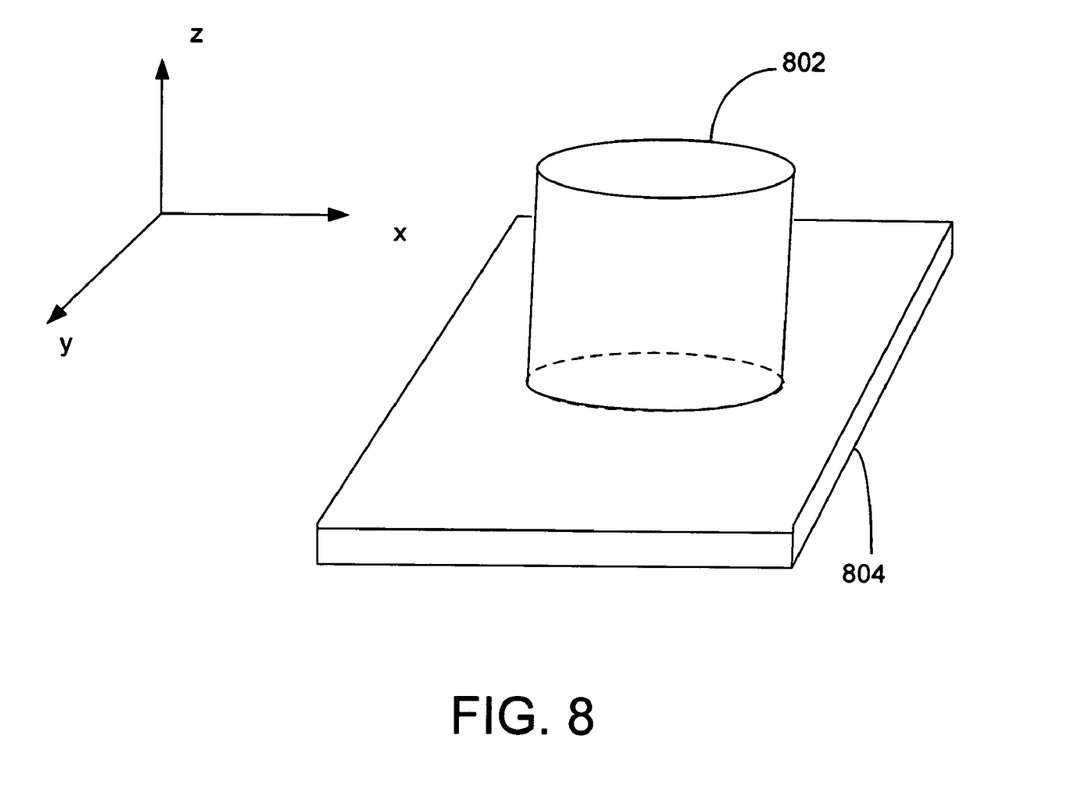
FIG. 8 is a diagram depicting the coordinate system of a camera lens and associated sensor. Shifting the lens in the z direction relative to the sensor changes the focus. Changes in the x and y directions changes the optical axis.
Figure 9:
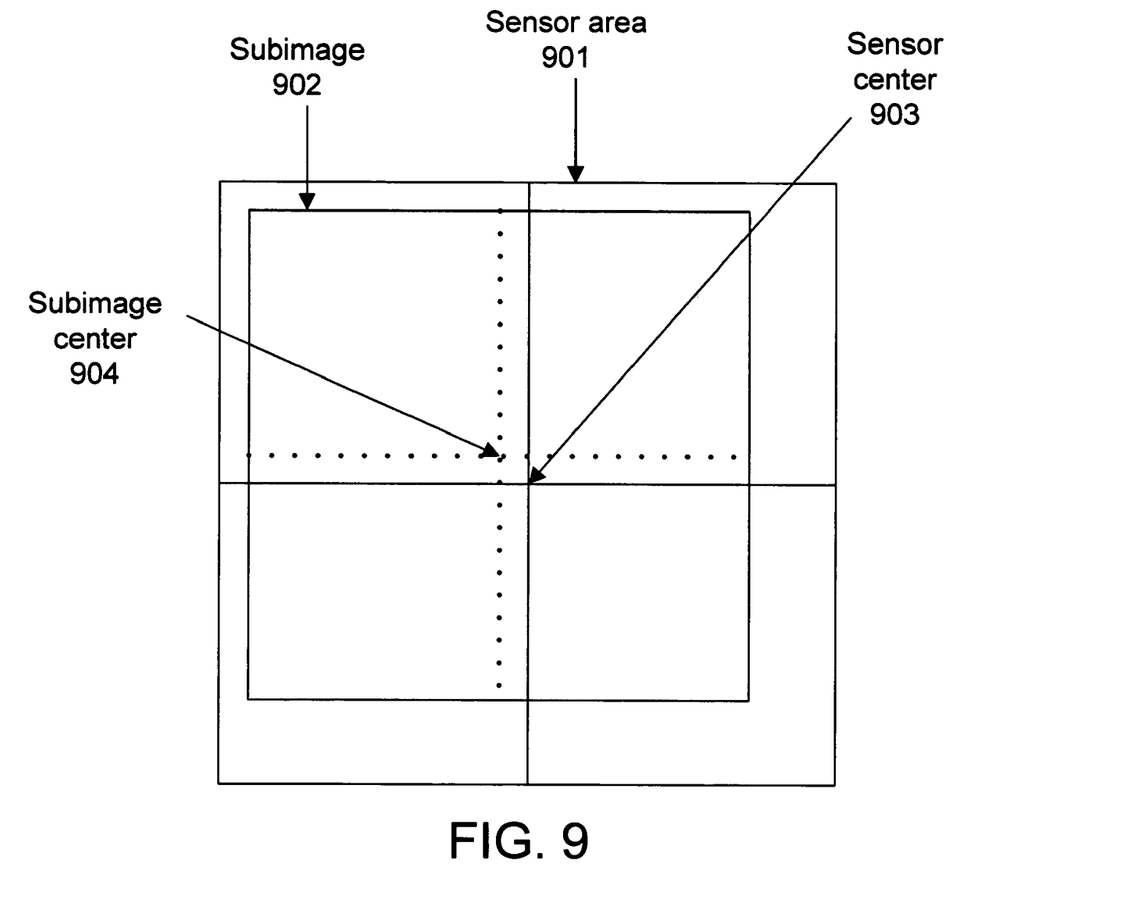
FIG. 9 is a diagram showing the sensor area and the sub-image used.

The camera system and method of the invention uses a sub-region of the image sensor for the active area to calibrate C'. This technique can be viewed as causing an image shift that changes the optical axis to intersect a nominal point on the calibration surface used for image stitching. By adjusting the location (x and y offset) of the sub-region as shown in FIGS. 7 and, 8, and 9, the virtual center of projection C' can be shifted parallel to the image plane, which simulates calibration screws on the lens (but advantageously involves with no moving parts). More specifically, changing the position of the lens relative to the sensor in the x and/or y directions changes the optical axis. Shifting the lens in the z direction relative to the sensor changes the focus. As discussed previously and shown in FIG. 7, for a camera with an optical axis angle with the vertical of $\chi$ 702 and with focal length f 704, the shift of the sensor 706 is defined by f*tan($\chi$). As shown in FIG. 9, the sensor area 901 contains a sub-image 902. The center of the sub-image 904 is offset from the sensor center 903.

To facilitate using a sub-region, the lens shown in FIG. 7 preferably has a slightly shorter focal length than otherwise required. The focal length f could be the same, but the sensor would then need to be larger, enough to accommodate the image shifting. The actual focal length required depends on the tolerances of the complete optical system, which determines how much C' needs to be adjusted. Therefore, one trades some image sensor resolution to avoid mechanical calibration.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, what is claimed is:

1. A camera system comprising:
an N-sided mirror located above N cameras, where N is a number of two or more, the N cameras arranged to be equally spaced around at least a portion of a circle, each camera capturing an image reflected in a different side of said N-sided mirror, wherein each camera has an up look angle from the horizontal plane achieved by horizontally mounting each camera sensor and electronically offsetting the center of each camera lens from the center of its associated sensor which in turn offsets the optical axis; so that the image in each mirror is completely captured by the sensor and wherein a virtual center of projection C' between adjacent cameras of the N cameras is simultaneously electronically calibrated by using a sub-region of the associated sensor.

2. The camera system of claim 1 wherein by adjusting the x and y offset of the lens relative to the sensor, the virtual center of projection C' is shifted to a desired position.

3. The camera system of claim 1 wherein the desired position of the virtual center of projection is electronically achieved using sensor sub-images.

4. The camera system of claim 1 wherein the focus of the camera is mechanically adjusted.

5. The camera system of claim 1 wherein said N cameras in total cover 360 degrees in the horizontal plane.

6. The camera system of claim 1 wherein the up look angle is achieved by offsetting the optical axis by the camera's focal length f multiplied by the tangent of the angle X of the optical axis with respect to the vertical.

* * * * *